United States Patent [19]
Nakai et al.

[11] 4,403,015
[45] Sep. 6, 1983

[54] COMPOUND SINTERED COMPACT FOR USE IN A TOOL AND THE METHOD FOR PRODUCING THE SAME

[75] Inventors: Tetsuo Nakai; Shuji Yazu; Akio Hara, all of Hyogo, Japan

[73] Assignee: Sumitomo Electric Industries, Ltd., Osaka, Japan

[21] Appl. No.: 227,787

[22] Filed: Jan. 21, 1981

[30] Foreign Application Priority Data

Oct. 6, 1979 [JP] Japan .............................. 54-129127
Oct. 9, 1979 [JP] Japan .............................. 54-130215

[51] Int. Cl.$^3$ ............................ B22F 3/14; B22F 7/08
[52] U.S. Cl. ................................ 428/565; 75/208 R; 428/697; 428/698; 428/699; 419/6; 419/13; 419/14
[58] Field of Search ............... 428/565, 697, 698, 699; 75/208 R

[56] References Cited

U.S. PATENT DOCUMENTS

| | | | |
|---|---|---|---|
| 3,752,655 | 8/1973 | Ramquist | 501/87 |
| 4,268,582 | 5/1981 | Hale et al. | 75/238 |
| 4,269,899 | 5/1981 | Fuyama et al. | 428/697 |
| 4,293,618 | 10/1981 | Hara et al. | 428/565 |
| 4,334,928 | 6/1982 | Hara et al. | 75/238 |

Primary Examiner—Mark Bell
Attorney, Agent, or Firm—Wenderoth, Lind & Ponack

[57] ABSTRACT

The invention enables to obtain a compound sintered compact for use in a cutting tool having particularly high properties in respect of bonded strength, hardness, wear resistance, plastic deformability and rigidity by bonding a diamond or cubic boron nitride containing hard layer to a cemented carbide substrate with interposition of an intermediate bonding layer.

A powder for forming the intermediate bonding layer comprising cubic boron nitride in an amount less than 70 volume %, the residual part principally consisting of a compound selected from among carbides, nitrides, carbonitrides or borides of 4a, 5a, 6a transition metals of the periodic table, an admixture thereof, or a mutual solid solution compound thereof, after pressing or in the state of powder, is placed on the cemented carbide substrate to a thickness less than 2 mm, or preliminarily applied to said cemented carbide substrate, further on said powder being placed a powder for forming the hard sintered compact containing diamond or cubic boron nitride in an amount in excess of 20 volume % after pressing or in the state of powder, the whole being hot pressed under an ultrahigh pressure and a high temperature to sinter the diamond or cubic boron nitride containing hard layer and the intermediate layer as well as to bond said hard layer, intermediate layer and substrate to each other, thereby enabling to obtain a compound sintered compact having the aforesaid superior properties for use in a cutting tool.

13 Claims, 2 Drawing Figures

COMPOUND SINTERED COMPACT FOR USE IN A TOOL AND THE METHOD FOR PRODUCING THE SAME

The invention relates to a compound sintered compact having high bonded strength for use in a tool and the method for producing the same.

Diamond and cubic boron nitride (hereinafter referred to as CBN) have been noted for their high properties in respect of hardness, thermal conductivity and chemical stability at elevated temperatures as the most suitable wear resisting materials for metal processing, and they have been used as grinding particles and in cutting tools.

Recently sintered compacts in which fine diamond particles or CBN particles are bonded by metals principally comprising Co and various ceramic bonded sintered compacts produced by the ultrahigh pressure sintering technique are commercially available.

In particular, the commercial diamond sintered compact is attracting the attention of industry circles as a material capable of enlarging the range of use of the diamond tools for its higher resistance to shocks compared with single crystal diamond. This metal-bonded diamond sintered compact has a diamond layer about 0.5 mm in thickness directly bonded to WC-Co substrate. As described in Patent Laying-Open Gazette No. SHO-52-12126, said metal-bonded diamond sintered compact is produced by the following process: a diamond powder is placed in contact with a WC-Co powder mixture or WC-Co obtained by preliminarily sintering said powder mixture the whole being heated under a high pressure in an ultrahigh pressure apparatus in order to dissolve Co of the WC-Co powder mixture or the WC-Co which is to be formed into a substrate thereby enabling the dissolved Co component to be transferred into the diamond powder to become a bonding material thereof.

The pressure and heat are applied under the condition in which diamond is thermodynamically stable. The dissolved Co, acting as a solvent of diamond, bonds the diamond sintered compact as well as the cemented carbide substrate. In the sintered compact thus obtained, the diamond particles are directly bonded to each other, while the cemented carbide substrate and the diamond sintered compact layer are made of the same metal, whereby integrated rigid bonding is obtainable.

When a machining tool is produced by use of a commercial diamond sintered compact, or a sintered compact in which fine CBN particles are bonded by metals principally consisting of Co, or a CBN sintered compact bonded by ceramics, it is a good method for the improvement of the strength of the tool to provide a hard layer containing diamond or CBN exclusively on the part to be formed into the cutting edge, said hard layer being bonded to a substrate having high rigidity in order to obtain a compound tool.

As an example of such compound tool, a cutting tool in which WC based cemented carbide substrate is covered by TiC or TiN is generally in use in recent years. The WC based cemented carbide, though extensively used as a cutting tool, is particularly suitable as a substrate of said compound tool for its high properties in respect of rigidity, toughness and thermal conductivity. The compound tool, however, has the following disadvantages.

The case in which diamond is contained in the hard layer will be described firstly. When a cutting tool is produced by use of a commercial diamond sintered compact bonded by metallic Co, the cemented carbide substrate to which the diamond sintered compact layer is bonded is soldered to a steel shank. Though the silver solder for use in soldering cemented carbide to steel has been developed in a large variety, the soldering temperature is generally 750°–800° C. At this temperature range, however, it occasionally happens that the diamond layer is exfoliated from the interface between said diamond layer and the cemented carbide substrate.

Even when no trouble occurs at a single process of soldering, exfoliation arises after repeated heating for several times. With a view to substantiating this phenomenon, two diamond sintered compacts directly bonded to cemented carbide substrates respectively were held in a vacuum furnace under a vacuum of $10^{-4}$ mm Hg and 800° C. for 30 minutes. In one of the two samples thus treated, the interface between the diamond sintered compact layer and the cemented carbide substrate had been completely exfoliated, while in the other sample the interface had cracks and easily exfoliated when force was applied thereto.

The exfoliation occurred on the interface between the diamond sintered compact layer and the cemented carbide substrate, and this was apparently due to deterioration of bonding strength of the interface through heating.

BRIEF DESCRIPTION OF THE DRAWINGS

FIG. 1 is a microphotograph (1500 magnifications) of the bonding interface between the sintered compact layer and the cemented carbide substrate of a commercial diamond sintered compact. The black continuous layer of diamond sintered compact has a construction in which diamond particles are connected with each other, the interposed white parts being metallic Co for bonding the diamond sintered compact, there being a layer in which Co has been enriched on the interface between the diamond sintered compact layer and the grey substrate, the diamond particles being bonded to WC-Co with interposition of Co.

Figure 1:
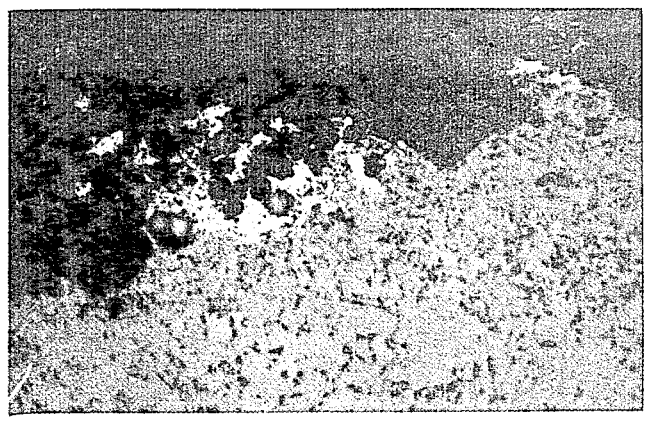
FIG. 1 is a microphotograph of the bonding interface between the sintered compact layer and the cemented carbide substrate.

According to the findings by the inventors concerned, when diamond particles are sintered under an ultrahigh pressure and a high temperature by making use of catalytic-solvent metal, for example, iron group metals, under the conditions in which diamond is dissolved but thermodynamically stable, the diamond sintered compact has its strength deteriorated at a relatively low temperature if re-heated under normal pressure.

This is presumably due to the fact that the iron group metals which are present in contact with the diamond particles have a catalytic action of promoting the countermetamorphosis of diamond into graphite.

In a sintered compact in which direct bonding between diamond particles has been developed in the diamond sintered compact layer, the contact interface between said layer and the iron group metals has been substantially reduced, whereby the deterioration of strength is reduced when the sintered compact is re-heated.

In case of the commercial sintered compact, though bonding between particles is developed in the diamond sintered compact layer, the interface between said layer and the cemented carbide substrate constitutes a bonding interface between the diamond particles and Co. Deterioration of such sintered compact can be anticipated when subjected to reheating, since reduction of strength is great at the interface between the sintered compact layer and the substrate. This is one of the greatest disadvantages of the compound sintered compact.

The deterioration of strength at the bonding interface may be avoidable by lowering the heating temperature when the tool is produced, for example, by selecting hard solder having a lower melting point. However, when a cutting tool is produced by use of low temperature soldering material, the soldering material is softened if the temperature of the cutting edge of the tool is elevated in the course of the cutting process until the soldered part is dislocated. Thus the range of use of such tool is inevitably limited.

The inventors concerned made a series of experiments in order to find out a method for obtaining a compound diamond sintered compact in which the bonding strength between the sintered compact layer and the cemented carbide substrate is never reduced even when subjected to heating. For example, the inventors concerned tentatively produced a sintered compact in which the diamond sintered compact layer contained an iron group metal as a solvent of diamond thereby enabling to bond the diamond particles directly with each other, while an intermediate layer of Cu which did not dissolve diamond was produced on the interface between the sintered compact layer and the cemented carbide substrate. With this compound sintered compact, no exfoliation arose between the diamond sintered compact layer and the cemented carbide substrate even when heated at 1000° C. in a vacuum.

A cutting tool produced from such compound sintered compact having an intermediate layer, which is low strength at elevated temperature, at the interface between the sintered compact layer and the cemented carbide substrate has a disadvantage in that the intermediate layer is susceptible to plastic deformation due to stress and heat applied to the diamond sintered compact layer constituting the cutting edge is destroyed.

There are two methods for producing a compound sintered compact containing CBN in its hard layer same as in the case of the aforedescribed diamond sintered compact: one is to bond the CBN containing hard sintered compact directly to the cemented carbide, while the other is to bond the $CB^N$ containing hard sintered compact to the cemented carbide with an intermediate layer interposed therebetween.

In the former case, the CBN containing hard sintered compact scarcely adheres to the cemented carbide substrate if the CBN bonding material has poor affinity for the cemented carbide, for example, $Al_2O_3$.

If hard sintered compact containing a large amount of CBN is directly bonded to the cemented carbide substrate, $Co_xW_yB_z$ which is very brittle though high hardness is produced in great amounts on the bonding interface as a result of WC-Co and CBN reactions thereby reducing the bonding strength. Thus the latter method in which an intermediate bonding layer is used is more preferable in order to rigidly bond the CBN containing hard sintered compact to the cemented carbide substrate.

In relation to the use of an intermediate bonding layer in bonding a hard sintered compact containing CBN, the method of using high temperature metallic solder as a bonding layer is disclosed in Patent Laying-Open Gazette No. SHO-51-64693.

It is described therein that the CBN hard sintered compact rigidly adheres to the cemented carbide substrate with interposition of high temperature metallic solder. However, in case $Al_2O_3$ is contained as CBN bonding material, the sintered compact layer scarcely adheres even to the metallic solder.

One of the greatest advantages is that, in ultrahigh pressure sintering, the sintering process proceeds with a phenomenon of denseness arising at a low temperature thereby enabling to control the grain growth. At a low temperature, however, the high temperature metallic solder scarcely reacts on the CBN containing hard sintered compact. The bonding strength, therefore, is very low.

Metallic solder melting at a low temperature has a disadvantage in that a metallic solder component flows into the sintered compact during the sintering process thereby deteriorating the properties of the sintered compact, or the bonding strength at the bonding face is reduced when the temperature is elevated during the cutting process thereby rendering the tool useless.

The properties required of the intermediate bonding layer for bonding the CBN containing sintered compact to the cemented carbide substrate are as follows: the intermediate bonding layer should be capable of rigidly adhering to the diamond or CBN containing hard sintered compact and the cemented carbide substrate at a low temperature during the ultrahigh pressure sintering process, and the thermal expansion coefficient thereof should substantially coincide with that of the diamond or CBN containing sintered compact and the cemented carbide substrate so that no excessive residual stress is produced in the sintered compact.

The intermediate bonding layer should be of a material scarcely susceptible to deformation at an elevated temperature so that it is free from plastic deformation due to stress and heat produced at the cutting edge of the tool. In addition, it should preferably have good thermal conductivity so as to facilitate the escape of heat produced at the cutting edge. It should have sufficient strength as a matter of course.

In view of the foregoing, the inventors concerned have reached the conclusion that a material containing CBN in an amount less than 70 volume %, the residual part comprising a compound selected from among carbides, nitrides, carbonitrides, borides of 4a, 5a, 6a transition metals of the periodic table, a mixture thereof or a mutual solid solution compound thereof, or a compound selected from among carbides, nitrides, carbonitrides, borides of 4a, 5a transition metals of the periodic table, admixture thereof, or a mutual solid solution compound thereof with Al or Si added thereto, is suitable for the said intermediate bonding layer.

Such intermediate bonding layer has high rigidity and superior thermal strength since it contains a compound selected from among carbides, nitrides, carbonitrides or borides of 4a, 5a, 6a transition metals of the periodic table or a mixture thereof.

The inventors concerned have experimentally found that, under the ultrahigh pressure and high temperature conditions for producing a diamond sintered compact, the diamond sintered compact is rigidly bonded to the cemented carbide substrate with interposition of the intermediate bonding layer. In the compound sintered compact comprising CBN, carbide and nitride and having an intermediate bonding layer, diamond solvent metals, such as Co, flowing from the cemented carbide substrate are not present in large amounts on the interface between the diamond sintered compact layer and the intermediate bonding layer, diamond particles being in direct contact with the intermediate bonding layer in a large area. Thus the strength is not reduced by reheating.

As described hereinabove, the invention is very useful since it enables to rigidly bond the diamond sintered compact layer to the cemented carbide substrate.

The inventors concerned produced a sintered compact in which the CBN bonding material was $Al_2O_3$ by use of an intermediate layer containing 60 volume % CBN, the residual part consisting of Al containing TiN. The CBN containing hard sintered compact was found to have been rigidly bonded to the cemented carbide substrate with interposition of the intermediate bonding layer.

Furthermore, by use of an intermediate layer containing 20 volume % CBN, the residual part consisting of a powder mixture of TiN and TaC, a powder containing 80 volume % CBN, the residual part consisting of $Al_2O_3$ and TiC, was subjected to ultrahigh pressure sintering at a high temperature of 1500°–1600° C.

As a result, it was found that the part of the CBN containing hard sintered compact was free from influx of Co which was the bonding metal of the cemented carbide substrate, though the intermediate layer permitted the influx thereof, thereby enabling to obviate the deterioration of the properties of the CBN containing hard sintered compact due to influx of Co.

The reason why the material containing CBN in an amount less than 70 volume %, the residual part comprising a compound selected from among carbides, nitrides, carbonitrides, borides of 4a, 5a, 6a transition metals of the periodic table, an admixture thereof, or a mutual solid solution compound thereof with Al or Si added thereto, is suitable for the intermediate bonding layer may be explained as follows.

Firstly, the adhesion between the diamond or CBN containing hard sintered compact and the intermediate bonding layer is reinforced by the affinity of carbides and nitrides of 4a, 5a, 6a metals of the periodic table in the intermediate bonding layer for iron group metals, carbides and nitrides used as bonding phases of the diamond powder or CBN powders, while, since the intermediate bonding layer and the hard layer are in contact with each other in the state of powder prior to sintering, the two layers have a mixed area of both materials therebetween in a width of several particles when sintered.

In addition, the bonding material of the hard layer reacts on CBN contained in the intermediate layer on the bonding face of the hard layer, while carbides, nitrides, carbonitrides and borides of 4a, 5a, 6a transition metals constituting the residual part of the intermediate bonding layer react on CBN in the hard layer, whereby the adhesion is reinforced.

Secondly, the intermediate bonding layer is rigidly bonded to the cemented carbide substrate since not only mutual solid solutions are formed between WC principally constituting the cemented carbide substrate and carbides, nitrides, carbonitrides, borides, etc. of 4a, 5a, 6a transition metals of the periodic table contained in the intermediate bonding layer, but also these compounds have high affinity for Co contained in the cemented carbide substrate. The fact that CBN contained in the intermediate bonding layer reacts moderately on Co of the cemented carbide substrate may be another factor of rigid adhesion.

Furthermore, the addition of Al and Si in excess of 0.1 weight % to carbides or nitrides of 4a, 5a metals of the periodic table makes it possible to improve not only the sinterability of the intermediate bonding layer but also the affinity between said compound and the diamond particles. The effect is particularly conspicuous in case of use of TiN among carbides, nitrides, carbonitrides, borides of 4a metals of the periodic table.

This is presumably attributable to the fact that TiN when Al is added thereto is sinterable even at a low temperature of 800°–900° C. and usable without the risk of fusion even at an elevated temperature of 1500°–1600° C., while it has high affinity for CBN in the hard sintered compact as well as WC in the cemented carbide substrate.

The intermediate bonding layer according to the invention has high hardness and superior thermal conductivity since it contains CBN thereby enabling the CBN containing hard sintered compact layer to exhibit its properties to the fullest extent.

If the CBN content of the intermediate bonding layer is in excess of 70 volume %, the residual part, that is, the content of carbides, nitrides, carbonitrides, borides, etc. of 4a, 5a, 6a metals of the periodic table, is inevitably reduced to an amount less than 30 volume %, whereby the ratio of formation of mutual solid solutions with WC on the interface between the intermediate bonding layer and the cemented carbide substrate is relatively reduced, while the boride produced by the reaction between WC-Co and CBN is excessively increased with the result that the intermediate bonding layer is rendered brittle. Thus the CBN content of the intermediate bonding layer is preferably less than 70 volume %.

The diamond or CBN content in the hard sintered compact is preferably in excess of 20 volume % since high properties as a tool are not obtainable if less than 20 volume %.

In general, the thickness of the hard layer of the compound sintered compact according to the invention is preferably within the range from 0.5 to 2 mm, though variable in conformity with the object of use.

In view of the fact that the flank wear width of the tool edge is usually less than 0.5 mm when the tool becomes useless to wear, it is sufficient if the hard layer has a thickness in excess of 0.5 mm when used as the cutting tool edge. A thickness in excess of 2 mm is practically unnecessary.

The thickness of the intermediate bonding layer characterizing the invention is less than 2 mm. The substrate onto which the hard layer is bonded with interposition of the intermediate bonding layer is made of cemented carbide.

A WC based cemented carbide substrate is particularly suitable for its high rigidity and good thermal conductivity as well as superior toughness due to the content of a metallic binder.

Figure 2:
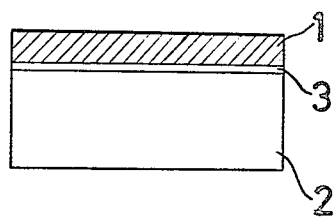
FIG. 2 shows the construction of the compound sintered compact according to the invention.

FIG. 2 shows the construction of the compound sintered compact according to the invention for use in a tool. The numeral 1 designates a diamond or CBN containing hard sintered compact layer used as the cutting edge of a tool, 2 designating WC based cemented carbide substrate, 3 designating an intermediate bonding layer according to the invention.

The compounds contained in said intermediate bonding layer comprise carbides, for example, TiC, ZrC, HfC, NbC, TaC, nitrides, for example, TiN, ZrN, HfN, TaN, or an admixture thereof, carbonitrides, for example, Ti(C,N), Zr(C,N), or borides, for example, $TiB_2$, $ZrB_2$, $HfB_2$.

The compound sintered compact according to the invention is produced by the following process. In order to obtain an intermediate bonding layer principally comprising CBN and carbides, nitrides, carbonitrides, borides, an admixture thereof, or a mutual solid solution compound thereof, a powder mixture layer is provided between the cemented carbide substrate and the powder for forming the diamond or CBN containing hard layer in the state of powder in a required amount, as a pressed body, or by applying it onto the cemented carbide substrate preliminarily in the state of slurry mixed with a suitable solvent, the whole being hot pressed under an ultrahigh pressure and a high temperature thereby enabling to sinter the diamond or CBN containing hard layer and the intermediate bonding layer comprising CBN, carbides, nitrides, carbonitrides, borides, etc. and synchronously bond them to the cemented carbide substrate.

The carbides, nitrides, carbonitrides, borides, etc. of 4a, 5a, 6a metals of the periodic table are compounds of high strength. However, under the ultrahigh pressure conditions (generally 20-90 Kb) for sintering the diamond or CBN containing hard layer, the particle of said compounds are deformed, crushed and easily stuffed in the state of denseness, the intermediate bonding layer being turned into a sintered compact of high density by the subsequent heating.

The powders of carbides, nitrides, carbonitrides of 4a metals of the periodic table forming the intermediate bonding layer are represented as follows.

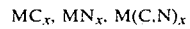

$MC_x$, $MN_x$, $M(C,N)_x$ wherein M stands for metals. They can be present in a wide range of value of x outside the stoichiometric composition (x=1).

According to the invention, rigid bonding is accomplished particularly when an unstoichiometric compound in which the value of x is less than 0.98, and preferably within the range from 0.9 to 0.5, is used.

The reason may be explained as follows. Since they have vacancies, they are readily sinterable at a low temperature, and when CBN is contained they rigidly combine with CBN by reacting thereon, while they rigidly adhere to diamond particles of the hard layer and WC of the substrate by reacting thereon. In the examples of the invention described hereinafter, all the compounds used therein have the value of x less than 0.98. $TiN_x$ in particular is a powder in which x is equal to 0.8.

According to the invention, the hard layer containing diamond or CBN in an amount in excess of 20 volume % is intended for the cutting edge when the sintered compact according to the invention is for use in a cutting tool.

According to the invention, the structure of the hard layer can be changed in conformity with its use.

When a diamond cutting tool is usually used with particular importance attached to wear resistance, a sintered compact comprising diamond in excess of 90 volume % can be provided to such use.

Though such diamond sintered compact is obtainable by sintering exclusively diamond powder, a bonding metal powder or metallic compound powder may be mixed with the diamond powder.

Alternatively, a solution of diamond forming catalytic metals and other bonding metals may be caused to permeate the diamond powder layer. In the diamond sintered compact commercially available at present in which the diamond powder layer is directly bonded to the cemented carbide substrate, Co contained in the substrate flows into the diamond powder layer to act as a binder of the diamond sintered compact.

According to the invention, the bonding metal can be selected independently of the bonding metal contained in the cemented carbide substrate.

The compound sintered compact according to the invention has a wide range of use comprising a maching bite, grindstone dresser, drill bit, etc. Particularly when it is soldered to a supporter by heating, its high properties are exhibited to the fullest extent. It enables one to obtain bonding strengths more stable than that of the conventional natural diamond cutting tool and commercial diamond sintered compact tool available at present.

When used in a place where intermittent cutting is practised, the compound tool according to the invention exhibits its high properties most satisfactorily since the diamond or CBN containing hard layer is rigidly bonded to the cemented carbide substrate with interposition of the intermediate bonding layer.

Particularly when the binder contained in the diamond or CBN containing hard layer has relatively poor affinity for the ultrahard alloy substrate, for example, $Al_2O_3$, $Si_3N_4$ or SiC, or when the diamond or CBN content is in excess of 80 volume %, the effect of the intermediate bonding layer according to the invention is far more conspicuous.

The invention will be described in more detail in reference to the following examples.

EXAMPLE 1

A powder comprising 60 volume % CBN, the residual part consisting of TiN containing 10 weight % Al, made into the state of slurry by adding an organic solvent containing ethyl cellulose thereto, was applied to the upper surface of a sintered compact 10 mm in outside diameter and 3 mm in height having a composition of WC-6% Co.

The sample thus produced was placed in a capsule made of Mo 10 mm in inside diameter and 12 mm in outside diameter, and then a diamond powder having a mean particle size of 5μ was stuffed into the capsule in an amount of 0.3 g so as to be in direct contact with the surface coated with the powder mixture of CBN, TiN and Al. Further thereon was placed a Fe-Ni alloy plate 0.3 mm in thickness. The capsule was sealed by a plug made of Mo and placed in an ultrahigh pressure apparatus for use in synthesizing diamond.

Pyroferrite was used as a pressure medium, while a graphite tube was used as a heater. The pressure was raised to 60 Kb and then the temperature was elevated to and held at 1300° C. for 30 minutes. The Mo-made capsule was taken out of the ultrahigh pressure apparatus and Mo was removed by grinding to obtain a sintered compact. The sintered compact thus obtained was a diamond sintered compact about 10 mm in outside diameter and 1 mm in thickness rigidly bonded to a WC-6% Co cemented carbide substrate with interposition of an intermediate bonding layer about 50μ in thickness containing CBN.

On observation of the bonding interface by means of XMA, it was found that the sintered compact had been rigidly bonded by Fe-Ni bonding material, while no place was observed where Co of the cemented carbide substrate and Fe and Ni used for diamond sintering were abundant.

The compound sintered compact was cut by means of a diamond cutter and soldered to a steel shank by use of ordinary silver solder for cemented carbide at about 800° C.

After the soldering process, the cutting edge was polished by a diamond grinder. On examination, no irregularity was found in the bonding condition between the diamond sintered compact layer and the cemented carbide substrate.

The cutting tool thus obtained was subjected to a cutting test on a round bar made of WC-12% Co cemented carbide 50 mm in outside diameter under the conditions of cutting speed 15 m/min, depth of cut 0.5 mm, and feed 0.1 mm/rev. The diamond sintered compact layer was free from exfoliation even after cutting for 20 minutes. The flank wear width of the tool was 0.15 mm.

A cutting tool was produced under the same conditions from a commercial sintered compact for use in a tool in which a diamond sintered compact was directly bonded to a cemented carbide substrate with Co as a binder. When this cutting tool was subjected to the same test under the same conditions, the diamond sintered compact layer was exfoliated from the interface between that and the cemented carbide substrate in the early stage of cutting thereby rendering the operation impracticable.

EXAMPLE 2

A CBN powder 3μ in mean particle size, a TiN powder 1μ in mean particle size and a TiC powder 1μ in mean particle size were mixed in the ratio of 5:3:2 by volume, respectively.

The powder mixture was pressed into a compact 10 mm in outside diameter and 1 mm in height. A WC-10% Co substrate was placed in a capsule made of Mo 12 mm in outside diameter and 10 mm in inside diameter, and then said pressed compact was placed thereon. Further thereon was placed a powder mixture of diamond and TiC 3μ in mean particle size. The capsule was hot pressed under an ultrahigh pressure in the same manner as in Example 1. The sintered compact thus obtained comprised a hard layer consisting of diamond and TiC rigidly bonded to the cemented carbide substrate with interposition of an intermediate layer about 0.8 mm comprising CBN, TiN, TiC and Ti(C, N).

The sintered compact was held in a vacuum furnace at a temperature of 1000° C. for 30 minutes. The sintered compact, however, showed no change and no exfoliation occurred at the interface thereof.

EXAMPLE 3

A WC-8% Co substrate coated with a powder mixture comprising 40 volume % CBN, the residual part consisting of TiN containing Al and Si, was placed in a capsule made of Mo 12 mm in outside diameter and 10 mm in inside diameter, and then a powder mixture comprising diamond particles, WC and Co below 1μ in mean particle size in the ratio of 80:15:5 by volume respectively was stuffed into the capsule so as to be in contact with said substrate. Similarly a powder mixture comprising diamond powder, WC and Co 1μ in mean particle size in the ratio of 40:50:10 respectively was stuffed into another capsule. The two capsules were sealed by Mo plugs and held in an ultrahigh pressure apparatus at 60 Kb and 1300° C. for 30 minutes.

The sintered compacts thus obtained comprised a diamond sintered compact layer rigidly bonded to the cemented carbide substrate with interposition of an intermediate bonding layer consisting of CBN, TiN, Al and Si, respectively. These compound sintered compacts were made into cutting tools in the same manner as in Example 1 and subjected to a cutting test on a workpiece of Al-20% Si having two V-shaped grooves circumferentially spaced by 180 degrees under the conditions of cutting speed 100 m/min, depth of cut 1 mm, and feed 0.30 mm/rev.

By way of comparison, a commercial sintered compact for use in a tool in which a diamond sintered compact is directly bonded to cemented carbide substrate was subjected to the same test under the same conditions.

In case of the two sintered compacts according to the invention, there was neither chipping of the cutting edge nor exfoliation from the bonding interface even after the passage across the V-shaped groove for 1000 times, whereas in case of the commercial sintered compact for use in a tool, exfoliation occurred after the passage across the V-shaped groove for 100 times.

EXAMPLE 4

A sintered compact of a composition of WC-60% Co 10 mm in outside diameter and 3 mm in height was placed in a capsule made of Mo 10 mm in inside diameter and 12 mm in outside diameter, and thereon was placed a pressed compact 10 mm in outside diameter and 0.5 mm in thickness of a powder mixture comprising CBN, TiN and TaN 5μ in mean particle size in the ratio of 3:6:1 by volume. Then a diamond powder 7μ in mean particle size in an amount of 0.3 g was stuffed into the capsule, and further thereon were placed a copper sheet 0.2 mm in thickness and a Ni disk 0.1 mm in thickness. The capsule was sealed by a plug made of Mo and sintered in an ultrahigh pressure apparatus at 1300° C. for 20 minutes in the same manner as in Example 1.

The sintered compact thus obtained comprised a diamond sintered compact layer about 10 mm in outside diameter and 1 mm in thickness rigidly bonded to a WC-Co substrate with interposition of an intermediate bonding layer 0.4 mm in thickness containing CBN.

Even when this compound sintered compact was heated at 1000° C. for 2 hours in a vacuum, it was free from exfoliation at the bonding interface, and was fully capable of standing the same cutting test as in Example 1.

EXAMPLE 5

A WC-6% Co substrate (10 mm in outside diameter and 3 mm in height) coated to a thickness of 0.1 mm with a TiN powder comprising 60 volume % CBN and 5 weight % Al for the residual part and made into the state of slurry with an organic solvent added thereto was placed in a Ni capsule 10 mm in inside diameter and 14 mm in outside diameter, and a 35 volume % CBN-Al₂O₃ powder mixture in an amount of 0.30 g was stuffed into the capsule so as to be in contact with said cemented carbide substrate. Then further thereon were placed a cemented carbide 3 mm in thickness and a copper plate 0.2 mm in thickness, respectively.

The capsule was sealed by a plug made of Ni and placed in an ultrahigh pressure apparatus for use in synthesizing diamond. Pyroferrite was used as a pressure medium, while a graphite tube as a heater. The pressure was raised to 55 Kb and then the temperature was elevated to and held at 1100° C. for 20 minutes.

Ni was ground off the capsule taken out of the ultrahigh pressure apparatus. The sintered compact thus obtained was of a size about 10 mm in outside diameter and 1 mm in thickness.

The sintered compact was rigidly bonded to the cemented carbide substrate having a CBN-TiN-Al intermediate bonding layer about 0.1 mm in thickness. The sintered compact, however, was not bonded to the substrate where no intermediate bonding layer was present, and could easily be exfoliated therefrom.

EXAMPLE 6

A CBN powder $3\mu$ in mean particle size was mixed with TiN in the ratio of 9:1. In the same manner as in Example 1, a WC-6% Co substrate was coated with a powder mixture comprising 40 volume % CBN, the residual part consisting of TiN, TiC and TiAl in the ratio of 5:4:1 by weight. A powder mixture consisting of 60 volume % CBN and 40 volume % TiN was stuffed into a Mo capsule so as to be in contact with the powder-coated surface of the cemented carbide substrate.

The whole was sintered at 1300° C. under an ultrahigh pressure of 50 Kb. The sintered compact thus obtained was rigidly bonded to the cemented carbide substrate with interposition of an intermediate bonding layer $50\mu$ in thickness consisting exclusively of CBN and TiN.

The compound sintered compact was cut by a diamond cutter and soldered to a steel shank at about 800° C. by means of ordinary silver solder for use in cemented carbide.

After the soldering, the cutting edge was polished by a diamond wheel. On examination, it was found that the diamond sintered compact layer had been rigidly bonded to the cemented carbide substrate with interposition of an intermediate bonding layer.

An observation of influx of impurities in the part of the cutting edge by means of an X-ray microanalyzer showed that there was no trace of influx of bonding metals of the cemented carbide.

The bonding strength of the CBN containing hard layer was tested by cutting a workpiece (SCM 21) having V-shaped grooves circumferentially at two places spaced from each other by 180 degrees. The test conditions were: cutting speed 100 m/min, depth of cut 1 mm; feed 0.35 mm/rev.

By way of comparison, a commercial sintered compact in which a CBN containing hard layer was bonded by Co directly to a cemented carbide substrate was subjected to the same test. As a result, it was found that the sintered compact according to the invention remained rigidly bonded to the cemented carbide substrate even after the passage across the grooves for 10000 times, where as in case of the commercial Co-bound sintered compact the CBN hard layer was exfoliated from the interface between that and the cemented carbide substrate after the passage across the grooves for 7000 times.

EXAMPLE 7

A WC-10% Co cemented carbide was placed in a capsule made of Mo 10 mm in inside diameter and 14 mm in outside diameter, and thereon was placed a pressed disk (10 mm in diameter and 0.5 mm in thickness) of a powder mixture comprising 20 volume % CBN, the residual part consisting of TiN and TaC. Then the capsule was stuffed with a powder mixture comprising 80 volume % CBN $3\mu$ in particle size, the residual part consisting of $Al_2O_3$ and TiC, and sealed by a plug made of Mo.

The whole was placed in an ultrahigh pressure apparatus, in which it was held under a pressure of 70 Kb and a temperature of 16000° C. for 20 minutes.

In the sintered compact thus obtained, a CBN containing hard layer was rigidly bonded to the cemented carbide with interposition of an intermediate bonding layer.

As a result of an X-ray microanalyzer test of the intermediate bonding layer, it was demonstrated that Co of the cemented carbide, though present in the intermediate bonding layer, had been completely prevented from infiltrating into the CBN containing hard layer.

What is claimed is:

1. A compound sintered compact for use in a tool characterized in that a hard sintered compact containing diamond or cubic boron nitride in an amount in excess of 20 volume % is bonded to a cemented carbide substrate with interposition of of an intermediate bonding layer less than 2 mm in thickness comprising cubic boron nitride in an amount effective to ensure rigid bonding between the hard sintered compact and the cemented carbide substrate but not exceeding 70 volume %, the residual part consisting essentially of a compound selected from the group consisting of carbides, nitrides, carbonitrides or borides of 4a, 5a, 6a transition metals of the periodic table, an admixture thereof, or a mutual solid solution compound thereof.

2. A compound sintered compact for use in a tool as defined in claim 1 wherein the intermediate bonding layer having a thickness less than 2 mm comprises cubic boron nitride in an amount effective to ensure rigid bonding between the hard sintered compact and the cemented carbide substrate but less than 70 volume %, the residual part essentially consisting of a compound selected from the group consisting of carbides, nitrides, carbonitrides or borides of Ti, Zr, Hf and, an admixture thereof, or a mutual solid solution compound thereof.

3. A compound sintered compact for use in a tool characterized in that a hard sintered compact containing cubic boron nitride in an amount in excess of 20 volume % is bonded to a cemented carbide substrate with interposition of an intermediate bonding layer less than 2 mm in thickness containing cubic boron nitride in an amount effective to ensure rigid bonding between the hard sintered compact and the cemented carbide substrate but not exceeding 70 volume %, the residual part essentially consisting of a compound selected from the group consisting of carbides, nitrides or carbonitrides of 4a, 5a metals of the periodic table, an admixture thereof, or a mutual solid solution compound thereof, with Al and/or Si added thereto in an amount in excess of 0.1 weight % and present in amounts sufficient to improve the sinterability of the intermediate bonding layer.

4. A compound sintered compact for use in a tool as defined in claim 3 wherein the intermediate bonding layer less than 2 mm in thickness comprises cubic boron nitride in an amount effective to ensure rigid bonding between the hard sintered compact and the cemented carbide substrate but not exceeding 70 volume %, the residual part consisting of TiC and TiN with an addition of Al in an amount in excess of 0.1 weight % and present in amounts sufficient to improve the sinterability of the intermediate bonding layer.

5. A method for producing a compound sintered compact for use in a tool characterized in that a powder for forming an intermediate bonding layer comprising cubic boron nitride in an amount effective to ensure rigid bonding between the hard sintered compact and the cemented carbide substrate but less than 70 volume %, the residual part consisting essentially of a compound selected from the group consisting of carbides, nitrides, carbonitrides or borides of 4a, 5a, 6a transition metals of the periodic table, an admixture thereof or a mutual solid solution compound thereof, after pressing or in the state of powder, is placed on a cemented carbide substrate to a thickness not exceeding 2 mm, or preliminarily applied to said cemented carbide substrate, further thereon being placed a powder for forming a hard sintered compact containing diamond or cubic boron nitride in an amount in excess of 20 volume % after pressing or in the state of powder, the whole being hot pressed under ultrahigh pressure and a high temperature thereby enabling one to sinter the hard layer containing diamond or cubic boron nitride and the intermediate bonding layer as well as to bond said hard layer, intermediate bonding layer and the substrate to each other.

6. A method for producing a compound sintered compact for use in a tool as defined in claim 5 wherein the powder for forming the intermediate bonding layer comprises cubic boron nitride in an amount effective to ensure rigid bonding between the hard sintered compact and the cemented carbide substrate but not exceeding 70 volume %, the residual part consisting essentially of a compound selected from the group consisting of carbides, nitrides, carbonitrides or borides of Ti, Zr, and Hf, an admixture thereof, or a mutual solid solution compound thereof.

7. A method for producing a compound sintered compact for use in a tool characterized in that a powder containing cubic boron nitride in an amount effective to ensure rigid bonding between the hard sintered compact and the cemented carbide substrate but less than 70 volume %, the residual part consisting essentially of a compound selected from the group consisting of carbides, nitrides or carbonitrides of 4a, 5a metals of the periodic table, an admixture thereof, or a mutual solid solution compound thereof, with a further addition of Al and/or Si in an amount in excess of 0.1 weight % and present in amounts sufficient to improve the sinterability of the intermediate bonding layer, is placed, after pressing or in the state of powder, on a cemented carbide substrate, or preliminarily applied to said cemented carbide substrate, further thereon being placed a powder for forming a hard sintered compact containing cubic boron nitride in an amount in excess of 20 volume % after pressing or in the state of powder, the whole being hot pressed under an ultrahigh pressure and a high temperature thereby enabling one to sinter the hard layer containing diamond or cubic boron nitride and the intermediate bonding layer and synchronously bonding them to the cemented carbide substrate.

8. A method for producing a compound sintered compact for use in a tool as defined in claim 7 characterized in that an unstoichiometric compound of which the value of x is less than 0.98, when carbides, nitrides, carbonitride or 4a metals of the periodic table are represented by $Mc_x$, $MN_x$, $(M(CN))_x$ respectively, is used as the material of the intermediate bonding layer.

9. A method for producing a compound sintered compact for use in a tool as defined in claim 8 wherein the nitride of 4a metal of the periodic table is $TiN_x$.

10. A compound sintered compact according to claim 1 in which the cubic boron nitride is present in an amount ranging from 20 volume % to 60 volume % in the intermediate layer.

11. A method for producing a compound sintered compact according to claim 5 in which the cubic boron nitride is present in an amount ranging from 20 volume % to 60 volume % in the intermediate layer.

12. A method for producing a compound sintered compact according to claim 7 in which the cubic boron nitride is present in an amount ranging from 20 volume % to 60 volume % in the intermediate layer.

13. A compound sintered compact according to claim 1 in which the residual portion of the intermediate layer other than the cubic boron nitride is at least present in an amount of 30 volume %.

* * * * *